Figure 1:
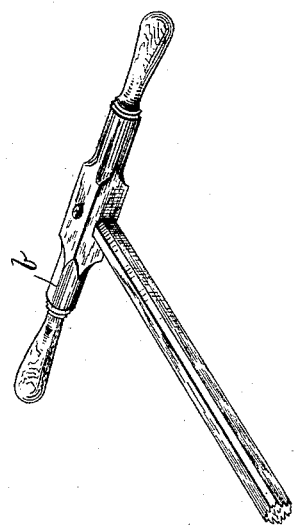
Figure 1:
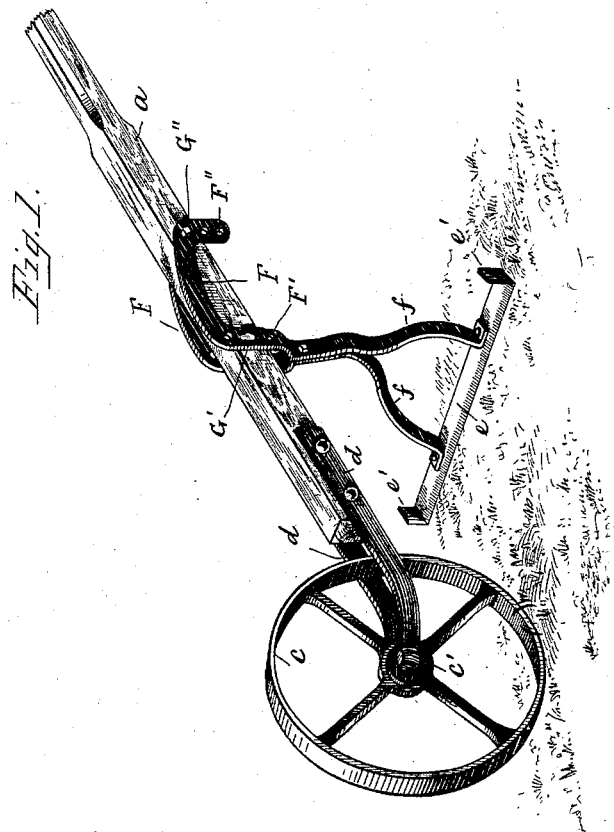

(No Model.)

S. FULLER.
WHEEL HOE.

No. 426,639. Patented Apr. 29, 1890.

Witnesses:
Geo. W. White
Mattie J. Jackson

Inventor.
Solomon Fuller.
by Alban Andrew his atty.

UNITED STATES PATENT OFFICE.

SOLOMON FULLER, OF DANVERS, MASSACHUSETTS.

WHEEL-HOE.

SPECIFICATION forming part of Letters Patent No. 426,639, dated April 29, 1890.

Application filed July 29, 1889. Serial No. 319,111. (No model.)

*To all whom it may concern:*

Be it known that I, SOLOMON FULLER, a citizen of the United States, and a resident of Danvers, in the county of Essex and State of Massachusetts, have invented new and useful Improvements in Wheel-Hoes, of which the following, taken in connection with the accompanying drawing, is a specification.

This invention relates to improvements in wheel-hoes for the purpose of weeding onions or other vegetables usually planted in rows, and for other similar purposes, as will hereinafter be more fully shown and described, reference being had to the accompanying drawing, which represents a perspective view of the improved wheel-hoe.

The improved wheel-hoe consists of the bar $a$, having a suitable handle $b$ in its upper end and provided in its lower end with a wheel $c$, journaled on a pin or bolt $c'$, passing through perforations in the bearings $d\ d$, which are suitably secured to the lower portion of the bar $a$, as shown in the drawing.

$e$ is the weeder, having its forward edge sharpened, and having, preferably, its ends bent upward at a right angle, or nearly so, to the blade $e$ in the form of lips. (Shown at $e'\ e'$ in the drawing.) The lips $e'\ e'$ serve to weed the plants close to their stalks without causing injury to their foliage or stems as the weeder advances.

To the blade $e$ is secured or made in one piece with it the blade-support, preferably made forked in its lower end, as shown at $f\ f$, said blade-support terminating in its upper ends as fulcrum plates or bars F F, having through their forward and rear portions a series of perforations F' F' and F'' F'', adapted to receive the respective fastening-bolts G' and G'', that pass through perforations in the bar $a$, and are provided with nuts, as shown in the drawing.

In the drawing I have shown two plates F F, one on each side of the bar $a$; but although this is preferable it is not essential, as I may use one plate only, secured to one side of the bar $a$, without departing from the essence of my invention.

Instead of having a series of perforations F' and F'' in the front and rear portions of the bars F F, slotted perforations may be used, although in practice I prefer to use perforations, as shown and described.

The frame parts $f\ f$ are preferably made thin in the direction of the line of motion of the hoe, so as to offer as little obstruction as possible to the earth that is being cut, raised, or foamed by the blade $e$.

By having the bars F F hung in an adjustable manner in their forward and rear ends any desired degree of adjustment of the weeder-blade $e$ may be obtained, both as to depth and pitch, which is a great advantage, as it is sometimes desired only to cut under the weeds without stirring or foaming the earth, in which case the blade $e$ is to be adjusted and secured in a horizontal, or nearly so, position. At other times it may be desired to not alone cut the weeds, but also to stir or foam the earth, in which case the blade $e$ is adjusted and secured in position with a more or less pitch, according to the depth of cut or amount of foaming desired by the operator.

What I wish to secure by Letters Patent, and claim, is—

1. The improved wheel-hoe, as described, consisting of a frame provided with a guide-wheel, combined with the weeder-blade $e$, secured to the frame $f$ F, and means for adjusting the front and rear portions of said frame, substantially in a manner and for the purpose set forth.

2. The improved wheel-hoe, as described, consisting of a frame provided with a guide-wheel, combined with the weeder-blade $e$, having upwardly-projecting lips $e'\ e'$, and the frame $f$ F, secured to said blade and having means, substantially as described, for adjusting it in its front and rear ends in a manner and for the purpose set forth.

In testimony whereof I have signed my name to this specification, in the presence of two subscribing witnesses, on this 6th day of May, A. D. 1889.

SOLOMON FULLER.

Witnesses:
 ALBAN ANDRÉN,
 CARL A. ANDRÉN.